United States Patent
Bonwick et al.

(10) Patent No.: US 7,716,445 B2
(45) Date of Patent: May 11, 2010

(54) METHOD AND SYSTEM FOR STORING A SPARSE FILE USING FILL COUNTS

(75) Inventors: Jeffrey S. Bonwick, Los Altos, CA (US); William H. Moore, Fremont, CA (US); Matthew A. Ahrens, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1057 days.

(21) Appl. No.: 11/406,592

(22) Filed: Apr. 19, 2006

(65) Prior Publication Data

US 2007/0106863 A1    May 10, 2007

Related U.S. Application Data

(60) Provisional application No. 60/733,706, filed on Nov. 4, 2005.

(51) Int. Cl.
*G06F 12/00* (2006.01)
*G06F 13/00* (2006.01)
*G06F 13/28* (2006.01)

(52) U.S. Cl. ...... 711/170; 711/154
(58) Field of Classification Search ...... None
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A * | 10/1998 | Hitz et al. | 707/203 |
| 6,209,111 B1 | 3/2001 | Kadyk et al. | |
| 6,341,341 B1 | 1/2002 | Grummon et al. | |
| 6,636,879 B1 | 10/2003 | Doucette et al. | |
| 6,654,772 B1 * | 11/2003 | Crow et al. | 707/205 |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 * | 12/2004 | Sawdon et al. | 707/102 |

(Continued)

OTHER PUBLICATIONS

Goodheart, B. et al.; "The Magic Garden Explained"; Prentice Hall, pp. 24-25, 29-30, 390-391, 1994.

(Continued)

*Primary Examiner*—Matt Kim
*Assistant Examiner*—Matthew R Chrzanowski
(74) *Attorney, Agent, or Firm*—Osha • Liang LLP

(57) ABSTRACT

A method for storing a first block and a second block, the includes storing the first block and the second block in a storage pool, and storing a third block in the storage pool, wherein the third block references the first block and second block and comprises a first fill count and a second fill count, wherein the first fill count corresponds to one selected from the group consisting of a number of data blocks directly referenced by the first block, a number of data blocks indirectly referenced by the first block, if the first block is an indirect block, wherein the first fill count is one if the first block is a data block.

7 Claims, 7 Drawing Sheets

U.S. PATENT DOCUMENTS

| | | | |
|---|---|---|---|
| 6,857,001 B2 | 2/2005 | Hitz et al. | |
| 6,892,211 B2* | 5/2005 | Hitz et al. | 707/202 |
| 6,978,283 B1* | 12/2005 | Edwards et al. | 707/206 |
| 7,007,196 B2 | 2/2006 | Lee et al. | |
| 7,032,154 B2 | 4/2006 | Kidorf et al. | |
| 7,043,677 B1 | 5/2006 | Li | |
| 7,085,781 B2* | 8/2006 | Crow et al. | 707/201 |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 7,325,111 B1* | 1/2008 | Jiang et al. | 711/162 |
| 7,451,168 B1* | 11/2008 | Patterson | 707/206 |
| 7,457,822 B1* | 11/2008 | Barrall et al. | 707/104.1 |
| 7,506,111 B1* | 3/2009 | Hamilton | 711/156 |
| 7,562,077 B2* | 7/2009 | Bisson et al. | 707/4 |
| 7,562,203 B2* | 7/2009 | Scott et al. | 711/165 |
| 7,593,975 B2* | 9/2009 | Edwards et al. | 707/206 |
| 7,603,391 B1* | 10/2009 | Federwisch et al. | 707/203 |
| 2002/0004883 A1 | 1/2002 | Nguyen et al. | |
| 2002/0055942 A1* | 5/2002 | Reynolds | 707/200 |
| 2002/0087788 A1 | 7/2002 | Morris | |
| 2002/0161972 A1 | 10/2002 | Talagala et al. | |
| 2003/0033477 A1 | 2/2003 | Johnson et al. | |
| 2003/0126107 A1 | 7/2003 | Yamagami | |
| 2003/0145167 A1 | 7/2003 | Tomita | |
| 2003/0195903 A1* | 10/2003 | Manley et al. | 707/201 |
| 2004/0098720 A1 | 5/2004 | Hooper | |
| 2004/0105332 A1* | 6/2004 | Crow et al. | 365/202 |
| 2004/0107314 A1* | 6/2004 | Kim et al. | 711/114 |
| 2004/0123063 A1 | 6/2004 | Dalal et al. | |
| 2004/0225834 A1 | 11/2004 | Lu et al. | |
| 2004/0234000 A1 | 11/2004 | Page | |
| 2004/0268068 A1 | 12/2004 | Curran et al. | |
| 2005/0010620 A1 | 1/2005 | Silvers et al. | |
| 2005/0097270 A1 | 5/2005 | Kleiman et al. | |
| 2005/0235154 A1 | 10/2005 | Serret-Avila | |
| 2006/0168409 A1 | 7/2006 | Kahn et al. | |
| 2006/0218644 A1 | 9/2006 | Niles et al. | |
| 2006/0256965 A1 | 11/2006 | Rowe | |
| 2007/0106632 A1* | 5/2007 | Bonwick et al. | 707/1 |
| 2008/0040385 A1* | 2/2008 | Barrall et al. | 707/103 Y |
| 2008/0077762 A1* | 3/2008 | Scott et al. | 711/170 |
| 2009/0299966 A1* | 12/2009 | Schneider | 707/3 |

OTHER PUBLICATIONS

Austin, B. J.; "A Dynamic Disc Allocation Algorithm Designed to Reduce Fragmentation During File Reloading"; pp. 378-381, 1970.
Stallings, W.; "Computer Organization and Architecture: Designing for Performance"; Prentice Hall, pp. 377-378, 2000.
Sandberg, R. et al.; "Design and Implementation of the Sun Network Filesystem"; Sun Microsystems, Inc., 1985 USENIX Conference (12 pages).
McKusick, M. K. et al.; "A Fast File System for UNIX"; ACM Transaction on Computer Systems, vol. 2, No. 3, Aug. 1984, pp. 181-197 (17 pages).
Astrahan, M.M. et al.; "System R: Relational Approach to Database Management"; ACM Transactions on Database Systems, vol. 1, No. 2, Jun. 1976, pp. 97-137 (41 pages).
"VERITAS File System 3.4 Administrator's Guide" VERITAS Software Corporation, Nov. 2000, http://www.veritas.com; pp. 1-227 (227 pages).
Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).
Osorio, N. et al.; "Guidelines for Using Snapshot Storage Systems for Oracle Databases"; Oracle Corporation, Oct. 2001 (13 pages).
Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).
Sun StorEdge Instant Image 2.0 System Administrators Guide; Sun Microsystems, Inc., Feb. 2000, Revision A (106 pages).
Ylonen, T.; "Concurrent Shadow Paging: A New Direction for Database Research"; Laboratory of Information Processing Science, Helsinki University of Technology, SF-02150, Espoo, Finland, 1992 (8 pages).
Popek, G. et al.; "The LOCUS Distributed System Architecture"; The MIT Press, Cambridge, Massachusetts, 1985 The Massachusetts Institute of Technology (8 pages).
Gray, J. et al.; "The Recovery Manager of the System R Database Manager"; Computing Surveys, vol. 13, No. 2, Jun. 1981 (20 pages).
Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am 23.05. 1991 an der TU Berlin, and English Translation (245 pages).
Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).
"The Enterprise Challenge Served by Snapshot"; Whitepaper, 2001 LSI Logic Corporation (8 pages).
Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).
Suresh, Babu S.; "Persistent Snapshots"; Department of Computer Science and Automation, Indian Institute of Science, Bangalore—560 012, Jan. 2000 (38 pages).
"Proceedings of the 5th Annual Linux Showcase & Conference" USENIX Association, Oakland, California, Nov. 5-10, 2001 (11 pages).
Borg, A. et al.; "Fault Tolerance Under UNIX"; ACM Transactions on Computer Systems, vol. 7, No. 1, Feb. 1989, pp. 1-24 (24 pages).
Rosenblum, M. et al.; "The Design and Implementation of a Log-Structured File System"; Electrical Engineering and Computer Sciences, Computer Science Division, Univeristy of California, 1991 (15 pages).
Hecht, M. S. et al.; "Shadowed Management of Free Disk Pages with a Linked List"; ACM Transactions on Database Systems, vol. 8, No. 4, Dec. 1983, pp. 503-514 (12 pages).
Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).
Lorie, R. A.; "Physical Integrity in a Large Segmented Database"; ACM Transactions on Database Systems, vol. 2, No. 1, Mar. 1977, pp. 91-104 (14 pages).
Johnson, J. E. et al.; "Overview of the Spiralog File System", Digital Technical Journal, vol. 8, No. 2, 1996, pp. 5-14 (10 pages).
Santry, D. S. et al.; "Deciding When to Forget in the Elephant File System"; 17th ACM Symposium on Operating Systems Principles (SOSP '99), Dec. 1999; pp. 110-123 (14 pages).
Chutani, S. et al., "The Episode File System"; Proceedings of the 1992 USENIX Winter Technical Conference; 1992; (18 pages).
Seltzer, M.L.; "File System Performance and Transaction Support"; University of California at Berkeley, 1992 (131 pages).
"System Administration Guide, vol. 1", Feb. 2000, Sun Microsystems, Chapter 40.

* cited by examiner

METHOD AND SYSTEM FOR STORING A SPARSE FILE USING FILL COUNTS

CROSS-REFERENCE TO RELATED APPLICATIONS

This application claims benefit of U.S. Provisional Application Ser. No. 60/733,706 filed on Nov. 4, 2005, entitled "Fill Counts" in the names of William H. Moore, Jeffrey S. Bonwick, and Matthew A. Ahrens, and is hereby incorporated by reference.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Automatic Conversion of All-Zero Data Storage Blocks into File Holes" (application Ser. No. 10/853,915) filed on May 26, 2004; "Multiple Replication Levels with Pooled Devices" (application Ser. No. 60/733,848) filed on Nov. 4, 2005; and "Method and System for Object Allocation using Fill Counts" Ser. No. 11/408,134 filed on Apr. 20, 2006.

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

One common type of file stored in a file system is a sparse file. A file is considered to be a sparse file if the file contains one or more holes, where a hole is contiguous range of bytes in a file all of which have the value of zero. Thus, the actual data stored in the file is less (in some cases significantly less) than the size of the file. For example, the size of the file may be 8 Kb but may only have 512 bytes worth of data. Sparse files are commonly used by database applications.

SUMMARY

In general, in one aspect, the invention relates to a method for storing a first block and a second block, comprising storing the first block and the second block in a storage pool, and storing a third block in the storage pool, wherein the third block references the first block and second block and comprises a first fill count and a second fill count, wherein the first fill count corresponds to one selected from the group consisting of a number of data blocks directly referenced by the first block, a number of data blocks indirectly referenced by the first block, if the first block is an indirect block, wherein the first fill count is one if the first block is a data block.

In general in one aspect, the invention relates to a method for locating a hole in a file, comprising: obtaining a root associated with the file, wherein the root comprises a root block fill count and references a hierarchical data structure comprising a plurality of blocks pointer, if the root block fill count is not equal to the maximum fill count for the root, traversing the hierarchical data structure; and for each block pointer encountered: obtaining a fill count associated with the block pointer, determining whether the fill count is zero, if the fill count does not correspond to the maximum fill count for the block pointer, wherein the hole is located if the file count is zero.

In general in one aspect, the invention relates to a system, comprising: a storage pool comprising: a first block and a second block, and a third block referencing the first block and second block and comprising a first fill count and a second fill count, wherein the first fill count is associated with the first block and the second fill count is associated with the second block, and a storage pool allocator configured to store the first block, the second block, and the third block in the storage pool, wherein the first fill count corresponds to one selected from the group consisting of a number of data blocks directly referenced by the first block, a number of data blocks indirectly referenced by the first block, if the first block is an indirect block, wherein the first fill count is one if the first block is a data block.

Other aspects of the invention will be apparent from the following description and the appended claims.

DETAILED DESCRIPTION

Figure 1:
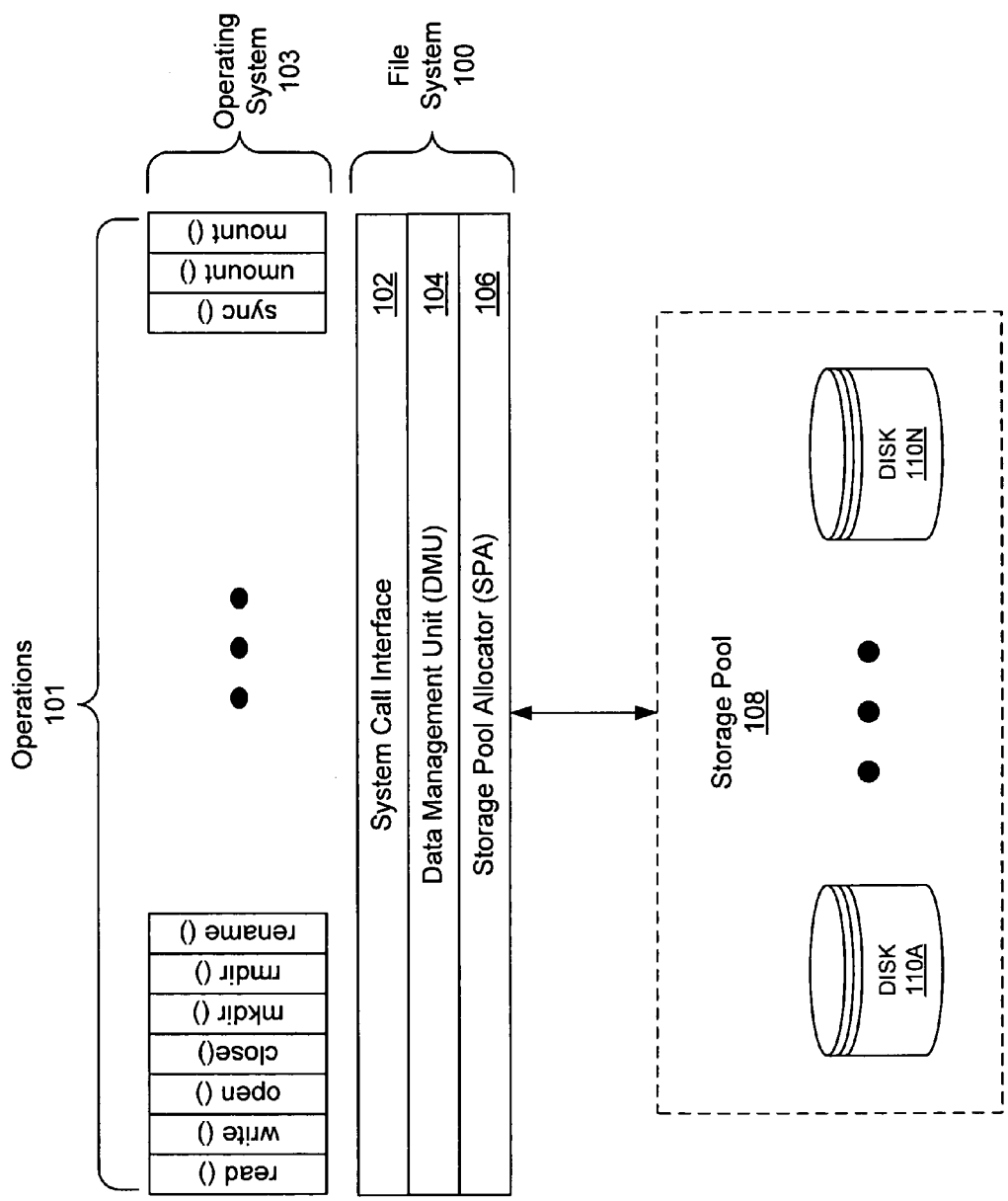
FIG. 1 shows a system architecture in accordance with an embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for storing a sparse file using fill counts. Further, embodiments of the invention related to using fill counts to locate holes in the sparse files.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
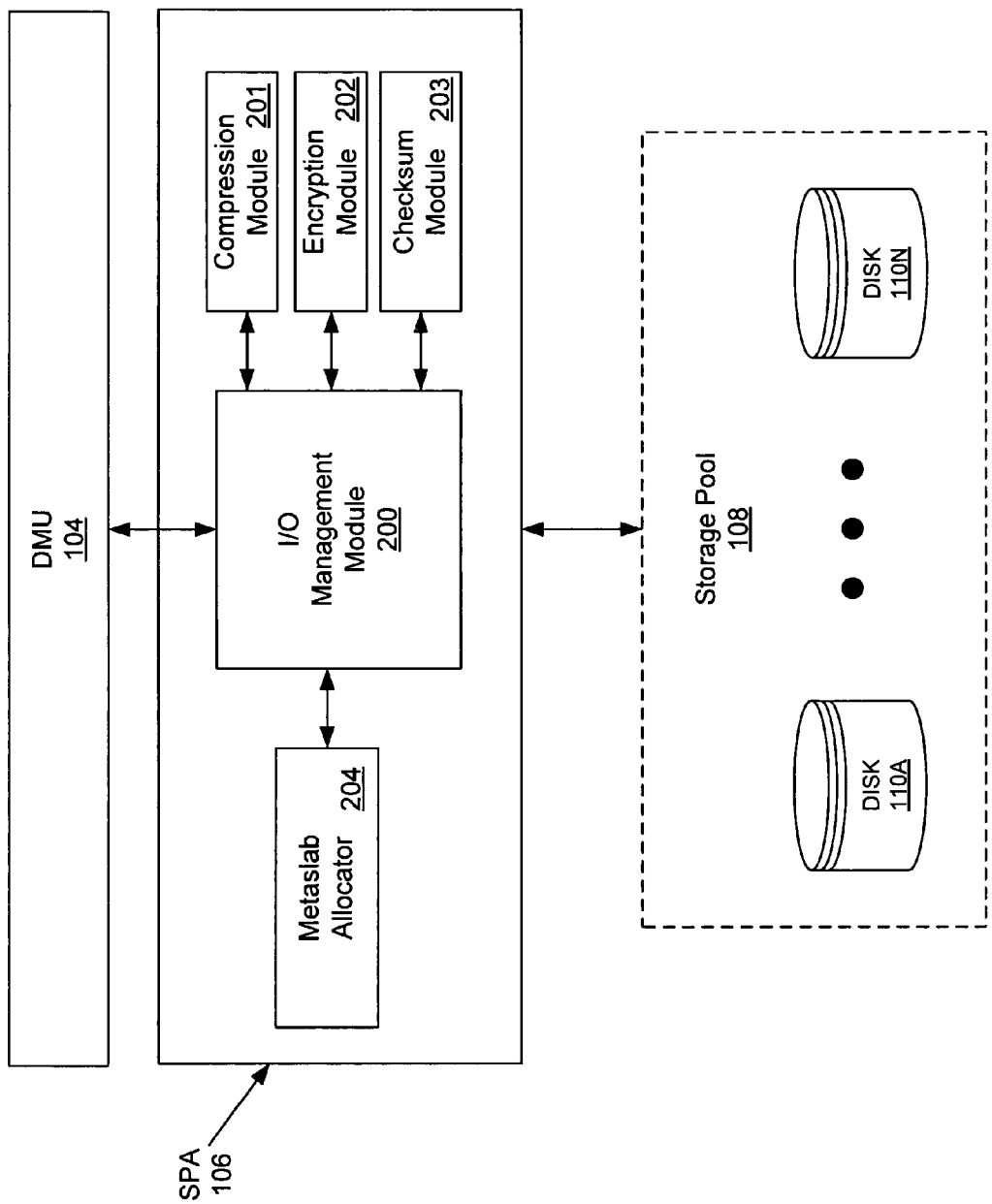
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
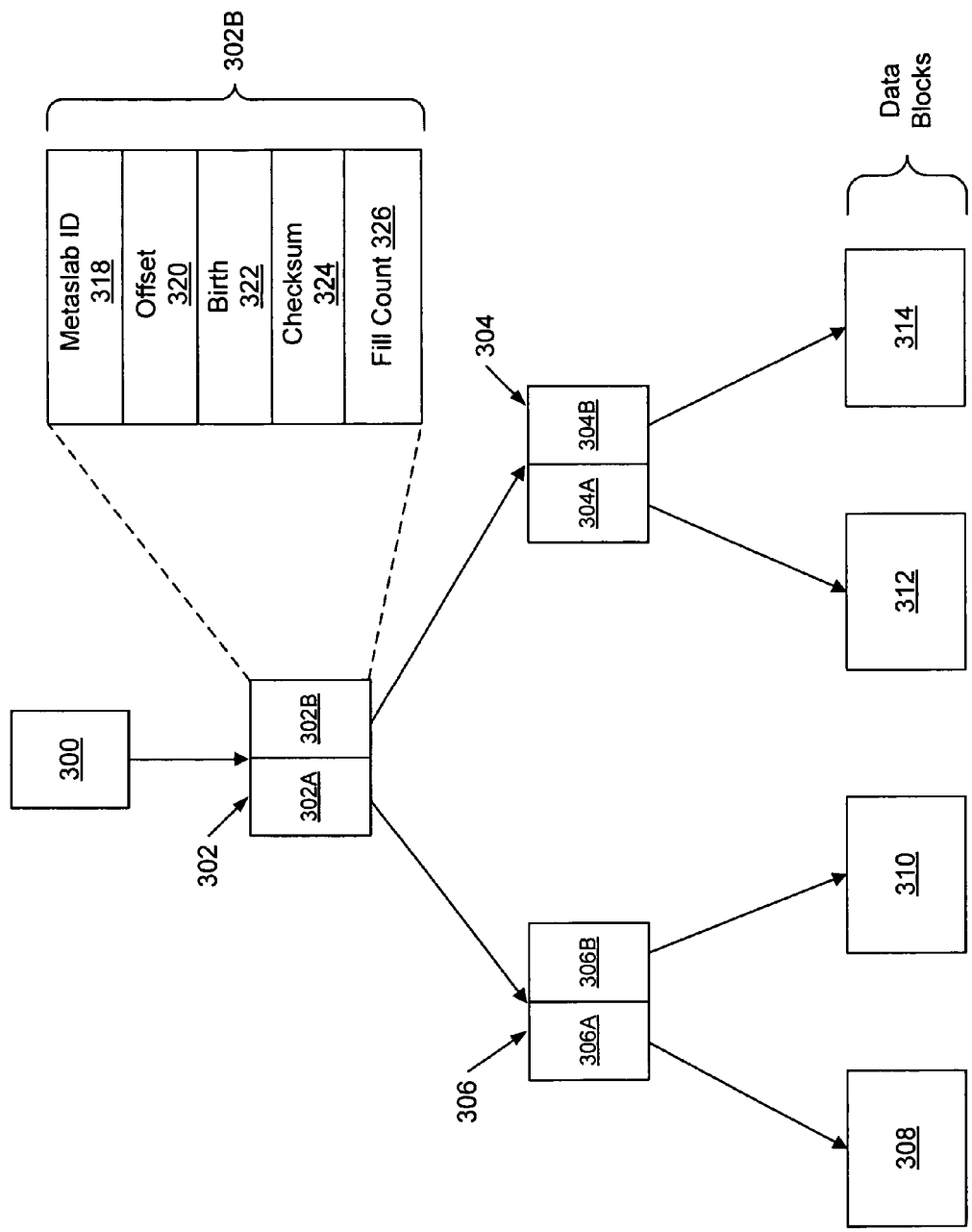
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, a checksum (324) of the data stored in the block (data block or indirect block) referenced by the block pointer, and a fill count (326). In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, the fill count (326) is a non-negative integer (i.e., 0, 1, 2, 3, etc.). Further, the fill count (326) recorded in a given indirect block pointer corresponds to either: (i) the sum of the fill counts recorded in all indirect blocks directly referenced by the block pointer or (ii) the number of non-zero data blocks referenced by the block pointer. (See FIG. 5 for an example).

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Using the infrastructure shown in FIGS. 1-3, the following discussion describes a method for writing metadata (i.e., indirect blocks) based on a replication scheme. Specifically, embodiments of the invention are directed towards replication of data and metadata.

Figure 4:
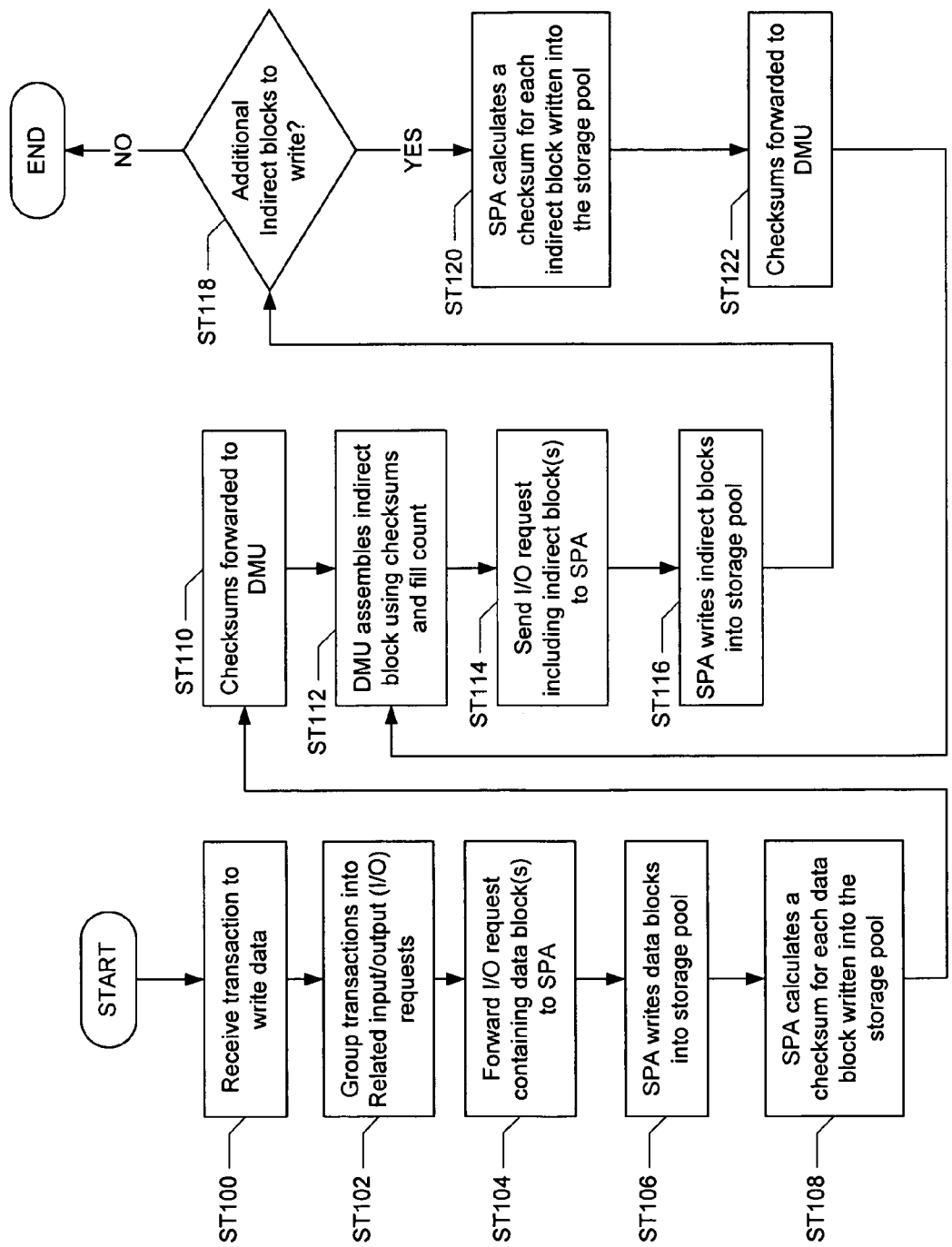
FIG. 4 shows a flow chart in accordance with an embodiment of the invention.

Using the infrastructure shown in FIGS. 1-3, the following discussion describes a method for implementing a self-validating checksum in accordance with one embodiment of the invention. FIG. 4 shows a flow chart in accordance with one embodiment of the invention. Initially, the DMU receives a transaction from an application, the operating system (or a subsystem therein), etc. (ST 100). The DMU subsequently groups the transaction into one or more I/O requests (ST 102). The I/O requests are subsequently forwarded to the SPA (ST 104).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST 104 includes data blocks.

Continuing with the discussion of FIG. 4, the SPA, upon receiving the I/O request including data blocks from the DMU, writes the data blocks into the storage pool (ST 106). The SPA subsequently calculates a checksum for each data block written into the storage pool (ST 108). In one embodiment, the checksum module (203 in FIG. 2) within the SPA is used to calculate the checksum for each data block written into the storage pool. The checksums are subsequently forwarded to the DMU (ST 110). The DMU then assembles the indirect blocks using the checksums and fill counts (ST 112). Specifically, the DMU places the checksum for a given data block and the fill count in the appropriate block pointer within the indirect block (i.e., the parent indirect block of the data block). In one embodiment of the invention, the fill count is calculated by the DMU. Continuing with the discussion of FIG. 4, next, the indirect blocks are forwarded to the SPA (ST 114). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 116). A determination is then made whether additional indirect blocks exist to write into the storage pool (i.e., whether the last indirect block written to the storage pool corresponds to the root block) (ST 118). If no additional indirect blocks exist, then the method is complete. However, if additional indirect blocks exist, then the SPA calculates the checksum from each of the indirect blocks written into the storage pool (ST 120). The checksums for each of the indirect blocks is subsequently forwarded to the DMU (ST 122). Steps ST 112 through ST 122 are subsequently repeated until the root block is written into the storage pool.

Figure 5:
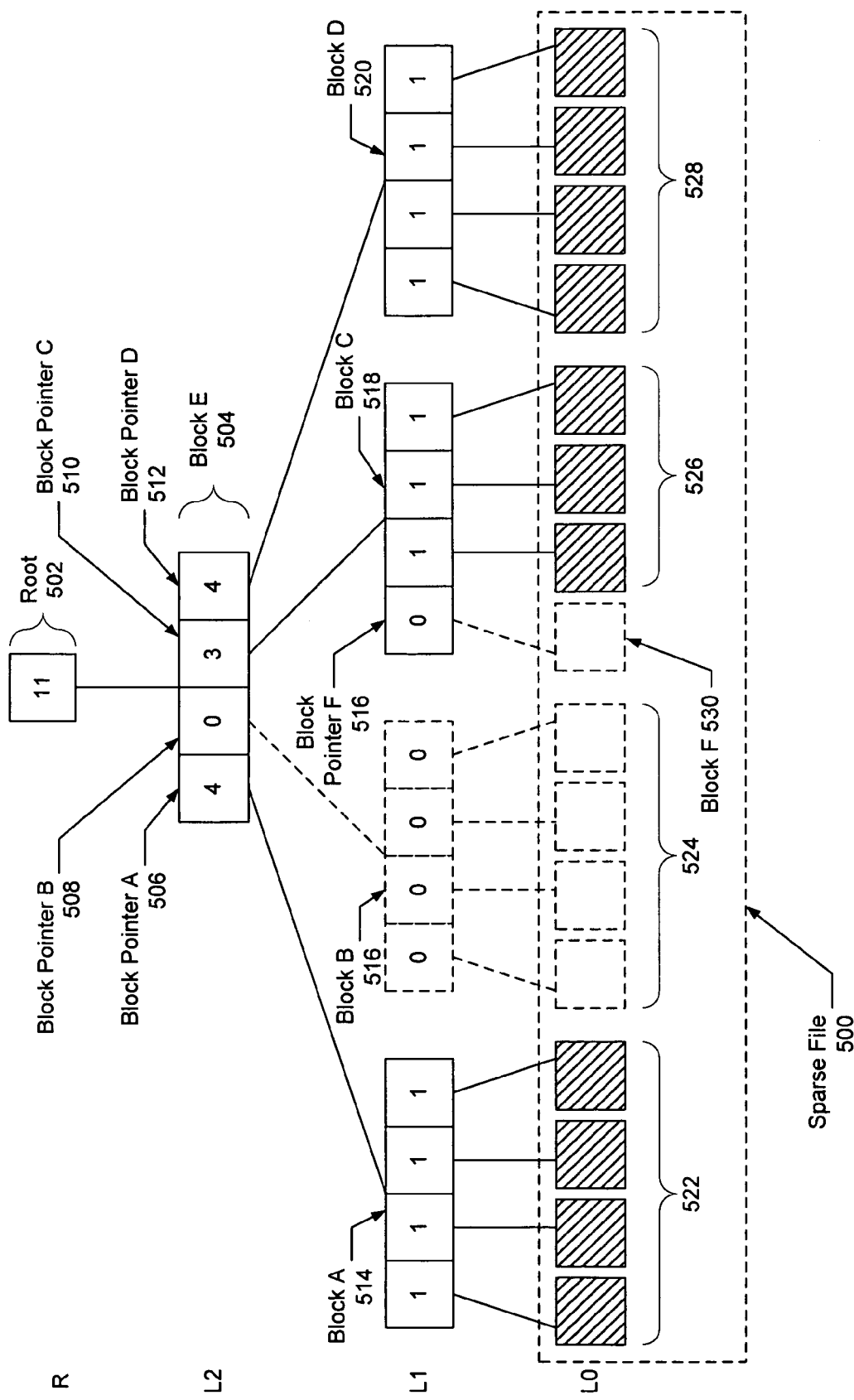
FIG. 5 shows a hierarchical data configuration in accordance with an embodiment of the invention.

In one embodiment of the invention, the method described in FIG. 5 is used to write all portions of a sparse file (i.e., the portions that include data and the portions corresponding to the holes.) As an alternative, in one embodiment of the invention, if the fill count for a given block pointer is zero, then the block pointer does not reference any additional indirect or data blocks. Accordingly, in this embodiment only portions of the file that contain data as well as a minimal amount of indirect blocks are allocated and written to in the storage pool. In the later embodiment, the DMU includes functionality to determine which blocks (indirect and data) need to written to storage and which blocks (data and indirect) do not need to be written to the storage pool.

FIG. 5 shows a hierarchical data configuration for a sparse file in accordance with one embodiment of the invention. The hierarchical data configuration shown in FIG. 5 corresponds to sparse file (500). As shown in FIG. 5, the sparse file (500)

is 8 Kb (assuming that each data block in L0 is 512 bytes), however, the sparse file only includes 5.5 Kb of data (represented by the hatched blocks). The remaining portion of the sparse file corresponds to a 1.5 Kb hole.

As discussed above, the DMU may include functionality to only allocate and write the data blocks, which contain data (i.e., the hatched blocks), and a minimal set of indirect blocks necessary to record the structure of the sparse file (500). Accordingly, for sparse file (500), the DMU does not need to write the block B (516), the group of data blocks (524) referenced by block B (516), or block F (530). However, the DMU does need to write block E (504) and record a fill count of zero in block pointer B (508) to maintain the location of the hole.

When sparse file (500) is written to the storage pool, the SPA first writes the non-zero data blocks (522, 526, and 528). Once the non-zero data blocks (522, 526, and 528) have been written, the block pointers in the indirect blocks (514, 518, 520) directly referencing the non-zero data blocks (522, 526, and 528) include a fill count equal to one. Note that block pointer F (516) includes a fill count of zero, because it does not reference any data block. The aforementioned indirect blocks (514, 518, 520) are subsequently written to the storage pool.

Once the aforementioned indirect blocks (514, 518, 520) are written to the storage pool, the DMU assembles block E (504). In assembling block E (504), the DMU (or a related process) determines the fill counts associated with each of the block pointers (506, 508, 510, 512) in block E (504). Specifically, the DMU sums the fill counts recorded in all indirect blocks (514, 518, 520) directly referenced by block E (504). Thus, the fill count for block pointer A (506) is determined by summing the fill counts recorded in the block pointers in block A (514). Similarly, the fill count for block pointer C (510) is determined by summing the fill counts recorded in the block pointers in block C (518) and the fill count for block pointer D (512) is determined by summing the fill counts recorded in the block pointers in block D (520). Finally, because block pointer B (506) does not reference any indirect blocks, its fill count is set to zero.

Once block E (504) has been assembled, it is written to the storage pool. Once block E (504) is written to the storage pool, the DMU assembles the root (502). The fill count for the root (502) is determined by summing the fill counts recorded in the block pointers (506, 508, 510, 512) in block E (504). Once the fill count for the root (502) is determined, the DMU finishes assembling the root (502) and subsequently issues the root to storage.

In one embodiment of the invention, if an application requests the sparse file, then the file system traverses the block tree using the method discussed in patent application Ser. No. 10/828,573. However, because no zero blocks are allocated in the file system, when the DMU requests that the SPA obtain a block referenced by a block pointer that has a fill count of zero, the SPA returns a data block containing all zeros. Note that the DMU, as opposed to the SPA, may include functionality to determine that request block contains all zeros, without having to request it from the SPA.

For example, in accordance with one or more embodiment of the invention, if an application requests the file system to obtain sparse file (500), the file system traverses the hierarchical data configuration shown in FIG. 5 and obtains all non-zero data blocks (522, 526, and 528). Once the file system obtains the aforementioned non-zero-data blocks, the file system, using the fill counts, assembles the sparse file (500). Said another way, the file system determines where the individual non-zero blocks are located in the sparse and where the hole(s) is located in the sparse. Once the sparse file has been reassembled, the sparse file is provided to the requesting application.

Using fill counts, holes in the sparse file may be efficiently located. In general, holes in the sparse files may be located by traversing the hierarchical data configuration (or the corresponding physical blocks on disk (i.e., the physical blocks on disk storing the blocks that make up the hierarchical data configuration)) and determining where the zero-blocks are located. Because the indirect blocks maintains fill counts, the location of the holes in the file may be ascertained by searching for the presence of indirect blocks whose fill counts equal zero. In one embodiment of the invention, the location of a hole in a file may be obtained in O (log n) time, wherein n corresponds to the number of logical data blocks (including logical blocks corresponding to hole(s)) in the sparse file.

Figure 6:
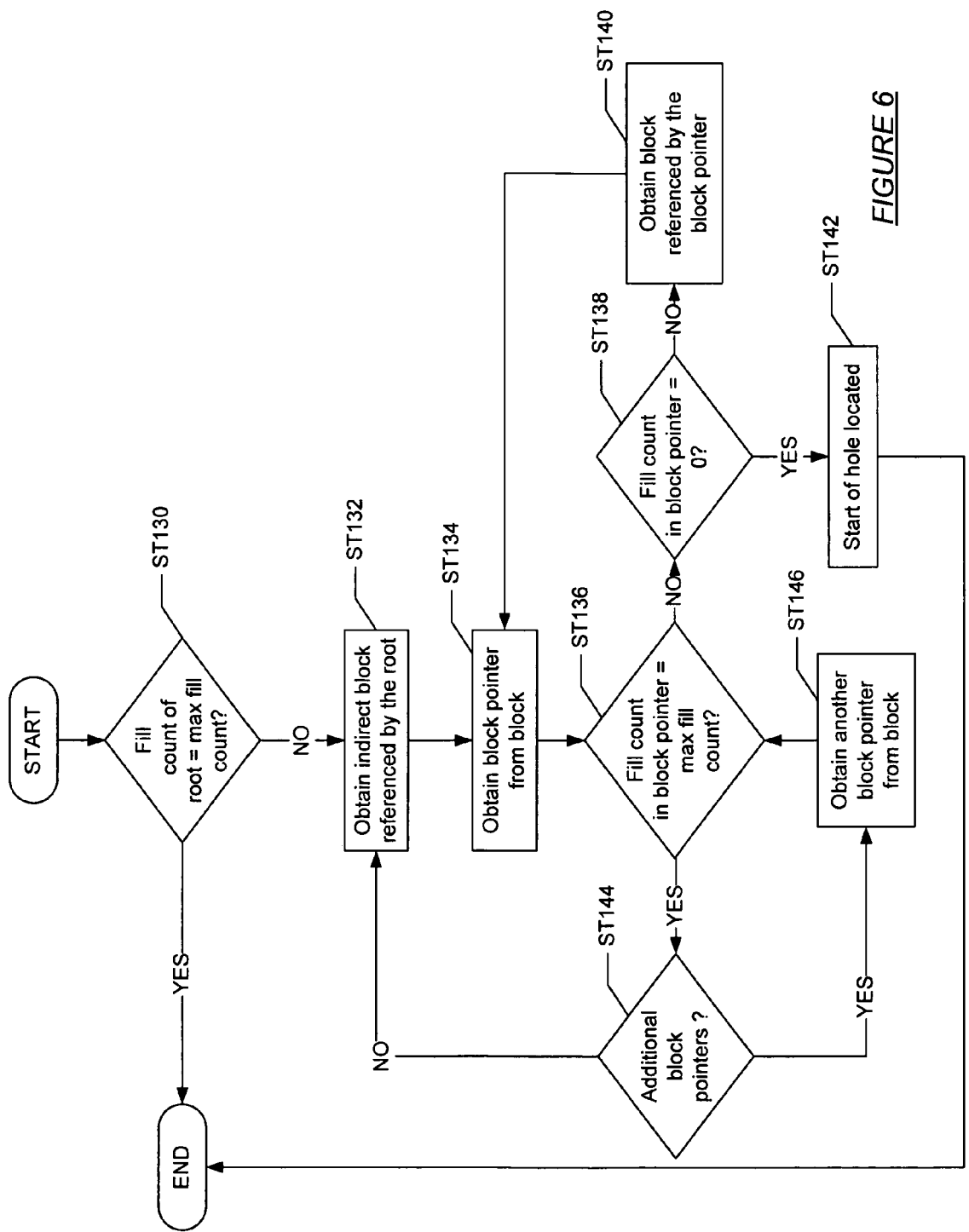
FIG. 6 shows a flow chart in accordance with an embodiment of the invention.

FIG. 6 shows a flowchart in accordance with one embodiment of the invention. More specifically, FIG. 6 shows a process for locating a hole in a file. Initially, a root of file is obtained and a determination is made about whether the fill count stored in the root is equal to the maximum fill count (ST100). In one embodiment of the invention, the maximum fill count for a given block corresponds to the fill count that would exist in the block if there were no holes in the portion of the file referenced by the block. For example, returning to FIG. 5, the maximum fill count for the root block (R) is 16. However, because the root block references the entire file and the file is sparse (i.e., includes a hole), the fill count in the root block is less then 16.

Returning to FIG. 6, if the fill count stored in the root is equal to the maximum fill count, then no holes in the file are present and the process ends. However, if the fill count stored in the root is not equal to the maximum fill count, then a hole is present in the file. The following steps are then performed to locate the start of the hole closest to the left side of the hierarchical data configuration. Those skilled in the art will appreciate that the method may be modified to locate the hole closest to the right side of the hierarchical data configuration.

Initially, the indirect block referenced by the root is obtained (ST102). The first block pointer in the indirect block is then obtained (ST104). A determination is then made about whether the fill count in the block pointer is equal to the maximum fill count of the block pointer (ST106). For example, returning to FIG. 5, block pointer A (506) has a fill count of four, which corresponds to the maximum fill count and, thus, there is no hole in the portion of the file referenced by block pointer A (506).

Returning to FIG. 6, if the fill count in the block pointer is equal to the maximum fill count of the block pointer, the next block pointer in the indirect block is obtained (ST114) and then the process proceeds to ST106. If the fill count in the block pointer is not equal to the maximum fill count of the block pointer, then a file hole exists in the portion of the file referenced by the block pointer. In such cases, a subsequent determination is then made about whether the fill count is equal to zero (108). If the fill count is equal to zero, then the start of the hole is located (ST112). Alternatively, if the fill count is not equal to zero, then the process proceeds to obtain the indirect block referenced by the block pointer (ST110). The process then proceeds to ST104.

Those skilled in the art will appreciate that any method of traversing the hierarchical data configuration to locate a zero-block in the file may be used. Those skilled in the art will also appreciate that the method shown in FIG. 6 may be extended to locate all holes in the file. Specifically, the method in FIG. 6 may be extended to locate all block pointers which contain fill counts equal to zero.

Further, those skilled in the art will appreciate that the method described in FIG. 6 may be extended to find the end of the file hole as well. Specifically, once the beginning of the hole is located, the hierarchical data configuration may be traversed to locate the first block pointer, starting at the L1 level, having a non-zero fill count. Further, those skilled in the art will appreciate that the method described in FIG. 6 may be modified to locate data, as opposed to file holes, in the sparse file.

Figure 7:
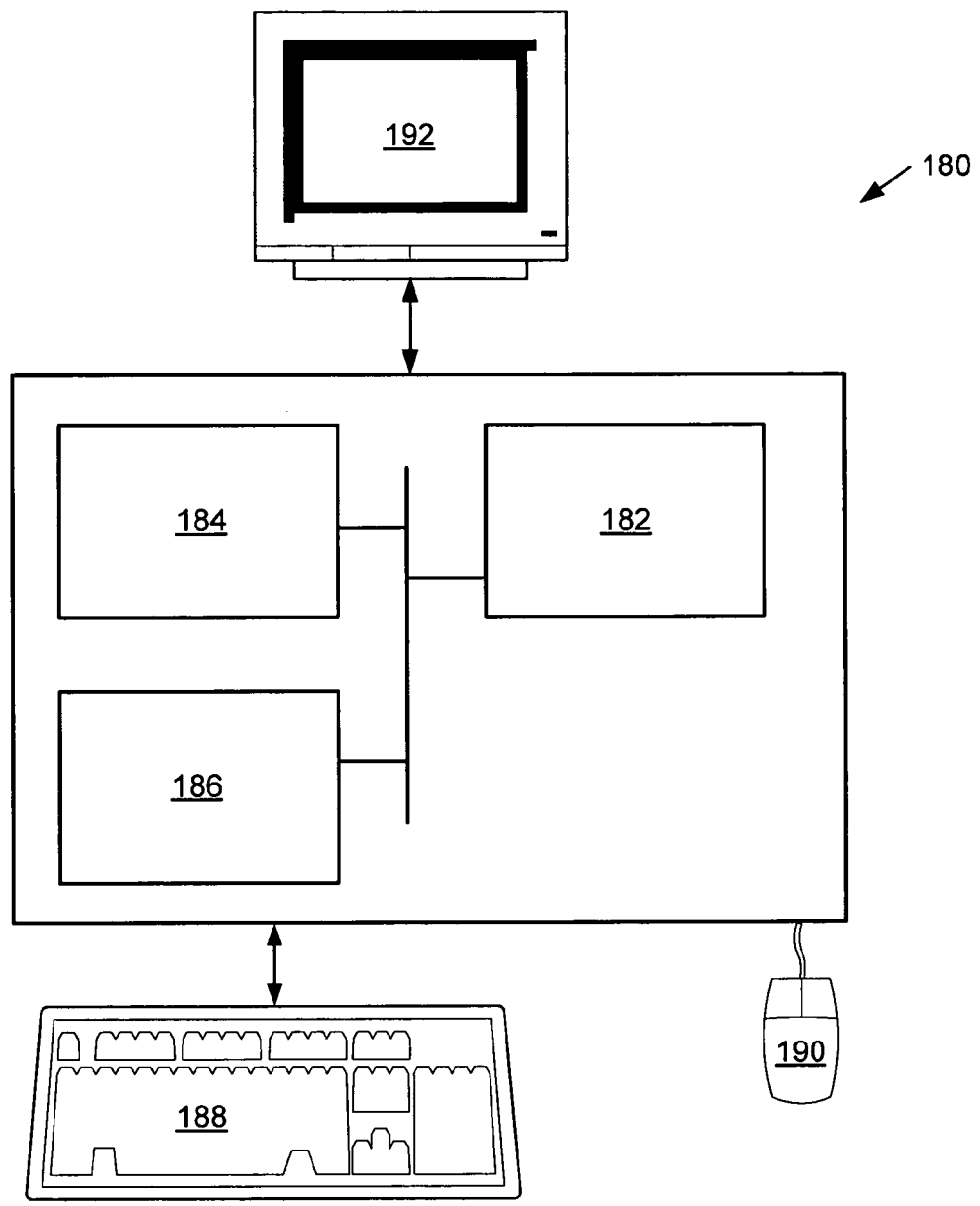
FIG. 7 shows a computer system in accordance with an embodiment of the invention.

The invention may be implemented on virtually any type of computer regardless of the platform being used. For example, as shown in FIG. 7 a networked computer system (180) includes a processor (182), associated memory (184), a storage device (186), and numerous other elements and functionalities typical of today's computers (not shown). The networked computer system (180) may also include input means, such as a keyboard (188) and a mouse (190), and output means, such as a monitor (192). The networked computer system (180) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (180) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable medium comprising instructions, which when executed by a processor perform a method for storing a first block and a second block, the method comprising:

storing the first block and the second block in a storage pool;

storing a third block in the storage pool, wherein the third block references the first block and second block and comprises a first fill count and a second fill count, wherein, if the first block is an indirect block, the first fill count corresponds to one selected from a group consisting of a number of data blocks directly referenced by the first block, and a number of data blocks indirectly referenced by the first block, wherein the first fill count is one if the first block is a data block; and storing a fourth block in the storage pool, wherein the fourth block references the third block and comprises a third fill count, wherein the third fill count comprises the sum of the first fill count and the second fill count.

2. The computer readable medium of claim 1, wherein the second fill count corresponds to the sum of fill counts recorded in all blocks referenced by the second block.

3. The computer readable medium of claim 1, wherein the first block, the second block, and the third block are associated with a sparse file.

4. A system, comprising:

a storage pool comprising:

a first block and a second block, and a third block referencing the first block and second block and comprising a first fill count and a second fill count, wherein the first fill count is associated with the first block and the second fill count is associated with the second block, a fourth block referencing the third block and comprising a third fill count, wherein the third fill count comprises the sum of the first fill count and the second fill count; and a storage pool allocator configured to store the first block, the second block, and the third block in the storage pool wherein, if the first block is an indirect block, the first fill count corresponds to one selected from a group consisting of a number of data blocks directly referenced by the first block, and a number of data blocks indirectly referenced by the first block, wherein the first fill count is one if the first block is a data block.

5. The system of claim 4, wherein the second fill count corresponds to the sum of fill counts recorded in all blocks referenced by the second block.

6. The system of claim 4, wherein the first block, the second block, and the third block are associated with a sparse file.

7. The system of claim 4, wherein the third block comprises:

a first block pointer referencing the first block, wherein the first block pointer comprises the first fill count;

a second block pointer referencing the second block, wherein the second block pointer comprises the second fill count; and a third block pointer comprises a third fill count, wherein the third fill count is zero.

\* \* \* \* \*